United States Patent
Harinaga

[11] Patent Number: 5,499,701
[45] Date of Patent: Mar. 19, 1996

[54] DISK BRAKE DEVICE HAVING A PISTON WITH AN AIR VENT GROOVE

[75] Inventor: Toshiyuki Harinaga, Nagoya, Japan

[73] Assignee: Nisshinbo Industries, Inc., Tokyo, Japan

[21] Appl. No.: 504,757

[22] Filed: Jul. 19, 1995

[30] Foreign Application Priority Data

Jul. 19, 1994 [JP] Japan .................. 6-188800

[51] Int. Cl.⁶ .................................. F16D 55/18
[52] U.S. Cl. .................................. 188/72.4; 188/370
[58] Field of Search .................. 188/72.4, 72.1, 188/71.1, 366, 367, 368, 369, 370; 277/212 FB; 29/888.044

[56] References Cited

U.S. PATENT DOCUMENTS

| | | | |
|---|---|---|---|
| 4,496,033 | 1/1985 | Hall et al. | 188/72.4 X |
| 5,150,772 | 9/1992 | Pantale et al. | 188/72.4 |
| 5,366,047 | 11/1994 | Beck et al. | 188/72.4 X |

FOREIGN PATENT DOCUMENTS

| | | | |
|---|---|---|---|
| 3902788 | 8/1990 | Germany | 188/72.4 |
| 62-38032 | 9/1987 | Japan . | |

Primary Examiner—Robert J. Oberleitner
Assistant Examiner—Peter M. Poon
Attorney, Agent, or Firm—Nikaido, Marmelstein, Murray & Oram

[57] ABSTRACT

A disk brake device is provided which is easier to assemble, and which prevents damage to the seal. One or more air vent grooves are molded to extend from the boot groove (5a) on piston (5), wherein in the axial direction, the length of one leg (9a) of the dust boot (9) inserted into piston (5) is shorter than the length of the air vent groove (5b), and the length from the bottom face of the cylinder cavity (2e) to the front end of the seal groove (2f) is shorter than the length from the bottom face of piston (5) to the rear end of the air vent groove (5b).

1 Claim, 5 Drawing Sheets

DISK BRAKE DEVICE HAVING A PISTON WITH AN AIR VENT GROOVE

FIELD OF INVENTION

This invention relates to a disk brake device.

BACKGROUND OF THE INVENTION

Patent Utility Model No. 62-38032 disclosed a sliding pin of a disk brake, which is applicable to a piston of a disk brake.

In this reference, the sliding pin is cantilevered to one side of the caliper or support, and the piston slides back and forth in a cavity molded in the other side of the caliper, or support. The caliper is moved back and forth in the axial direction of the rotor, and a seal is set around the perimeter of the cavity to form an airtight lock with the circumference of the piston. To seal off the sliding surface of the piston and cylinder cavity, a peripheral groove, into which a boot is set, is provided around the circumference of the piston from the rim of the sliding cavity, and depressed channel, with a passage into the peripheral groove, and extends towards the free end of the piston to a length virtually equal to the width of the peripheral groove and slightly longer than the dimension of the seal in the axial direction.

A disk brake device as described above has the following problems:

1. The sliding pin is inserted into a pouch-shaped caliper boss which is closed on the rear end while the open end is sealed tightly by a seal; hence air inside the caliper boss remains compressed until the sliding pin is inserted to a point where the depression passes through the seal, making it difficult to install the sliding pin.
2. Moreover, since the depression penetrates through the seal in order to exhaust the compressed air, the seal is damaged by the edge of the depression, which markedly reduces the tightness of the seal and detracted from the seal's useful life.
3. Normally, the expandable end of the boot is elastically affixed to the peripheral groove around the guide pin with an interference fit; therefore the width (the dimension in the axial direction) of the expandable end of the boot is set to be wider than the width of the guide pin groove. Moreover, since the width of the peripheral groove is set to be equal to the axial length of the depression, then the width of the expandable end of the boot becomes longer than the axial length of the depression. This means that the expandable end of the boot covers the depression, making it difficult for air inside the boot to be exhausted externally, thereby canceling the purpose of the depression.

A second type of conventional disk brake has a rotating disk rotating in tandem with a wheel. A pair of friction pads sandwiching and pressing against the rotating disk are provided to create friction. A caliper straddles a portion of a circumference of the rotating disk. One or more pistons are housed to slide within a cylinder cavity bored in the caliper and push the friction pads against the rotating disk. A seal fitted into a ring-shaped groove provided around an inner face of the cylinder cavity is designed to maintain a fluid-tight seal with the piston. A dust boot is installed between an open end of the cylinder cavity and a ring-shaped boot groove molded on a circumference of the piston to seal off the sliding surface.

The assembling process of this piston is a follows:

1. A boot is installed in a caliper;
2. Compressed air is introduced into the cylinder while a piston is pressed against a boot;
3. A boot is expanded to be elastically affixed to the circumference of the piston;
4. The piston is then inserted into the cylinder cavity of the caliper; and then
5. The boot is affixed to a boot groove of the piston.

The following problems are presented in the assembling process described above:

1. In the second step, compressed air is shut in the piston, boot, and piston seal, thereby causing excessive expansion of the boot.
2. This excessive expansion of the boot causes the boot be put out of joint from the piston.
3. To prevent the above disconnection, a stick may be inserted between the piston and the boot to exhaust the compressed air.

SUMMARY AND OBJECTS OF THE INVENTION

The objective of the present invention is to provide a disk brake device that will resolve the problems as described above, specifically to make the disk brake device easier to mount and to prevent damage to the seal.

As explained below in greater detail, this invention is effective as follows:

1. In assembling the disk brake device, compressed air introduced from the fluid inlet and accumulated in the dust boot can be exhausted via an air vent groove provided around the circumference of the piston. This configuration makes it extremely easy to assemble the device.
2. The axial length of the dust boot leg is shorter than the axial length of the air vent groove, in which case, the leg does not cover the air vent groove, and the compressed air within the dust boot can be adequately exhausted via the cover. Again this configuration makes it extremely easy to assemble the device.
3. The length from the bottom face of the cylinder cavity to the front end of the seal groove is shorter than the length from the bottom face of the piston to the back end of the air vent groove. Hence during assembly, even if the piston were to be pushed down to the bottom face of the cylinder cavity, the air vent groove will not catch on the seal. This prevents any damage to the seal, making it more durable.

DETAILED DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT OF THE INVENTION

Figure 1:
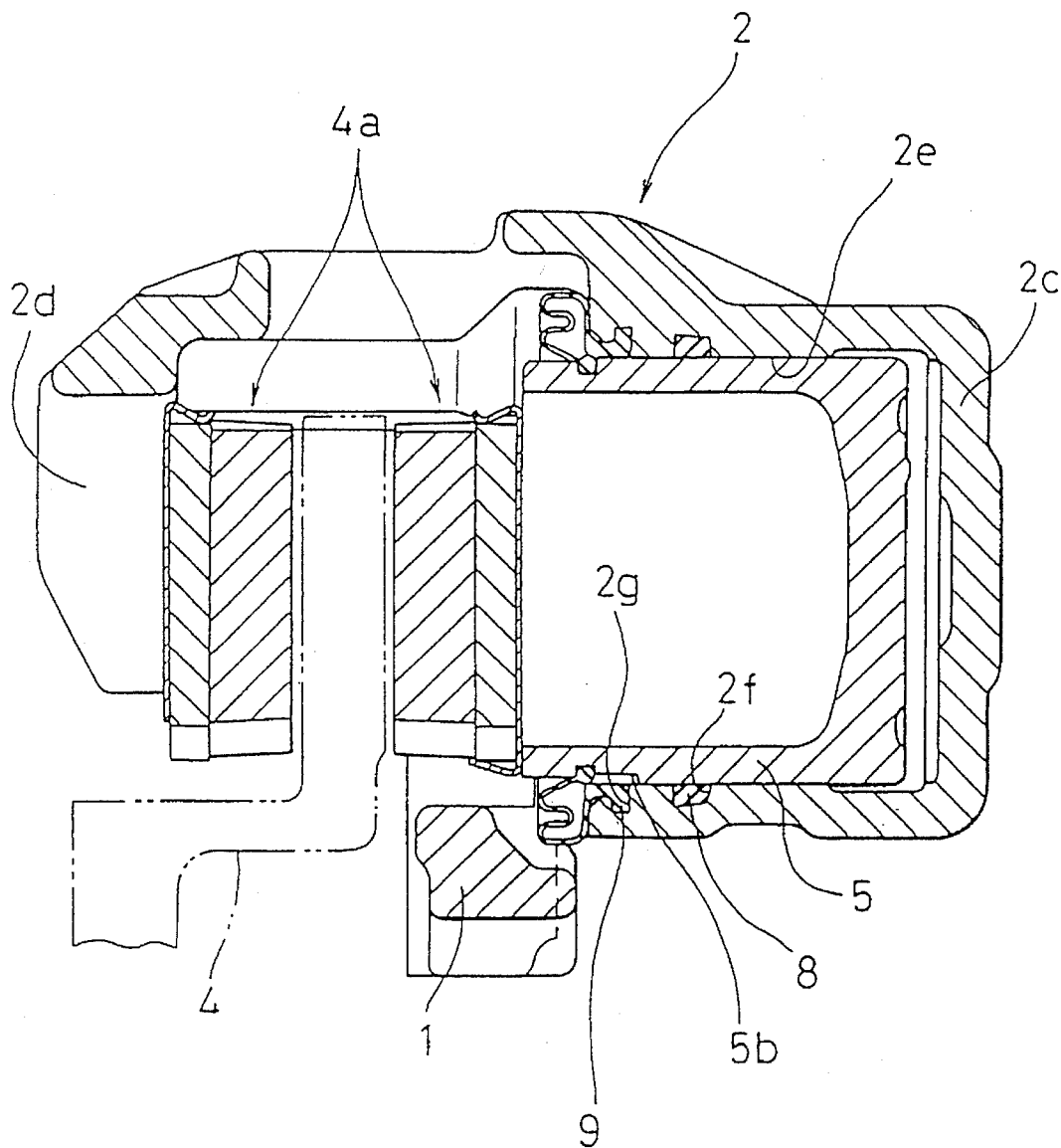
FIG. 1 is a cross section diagram of an internally expanding disk brake device as embodied in Example 1.
Figure 2:
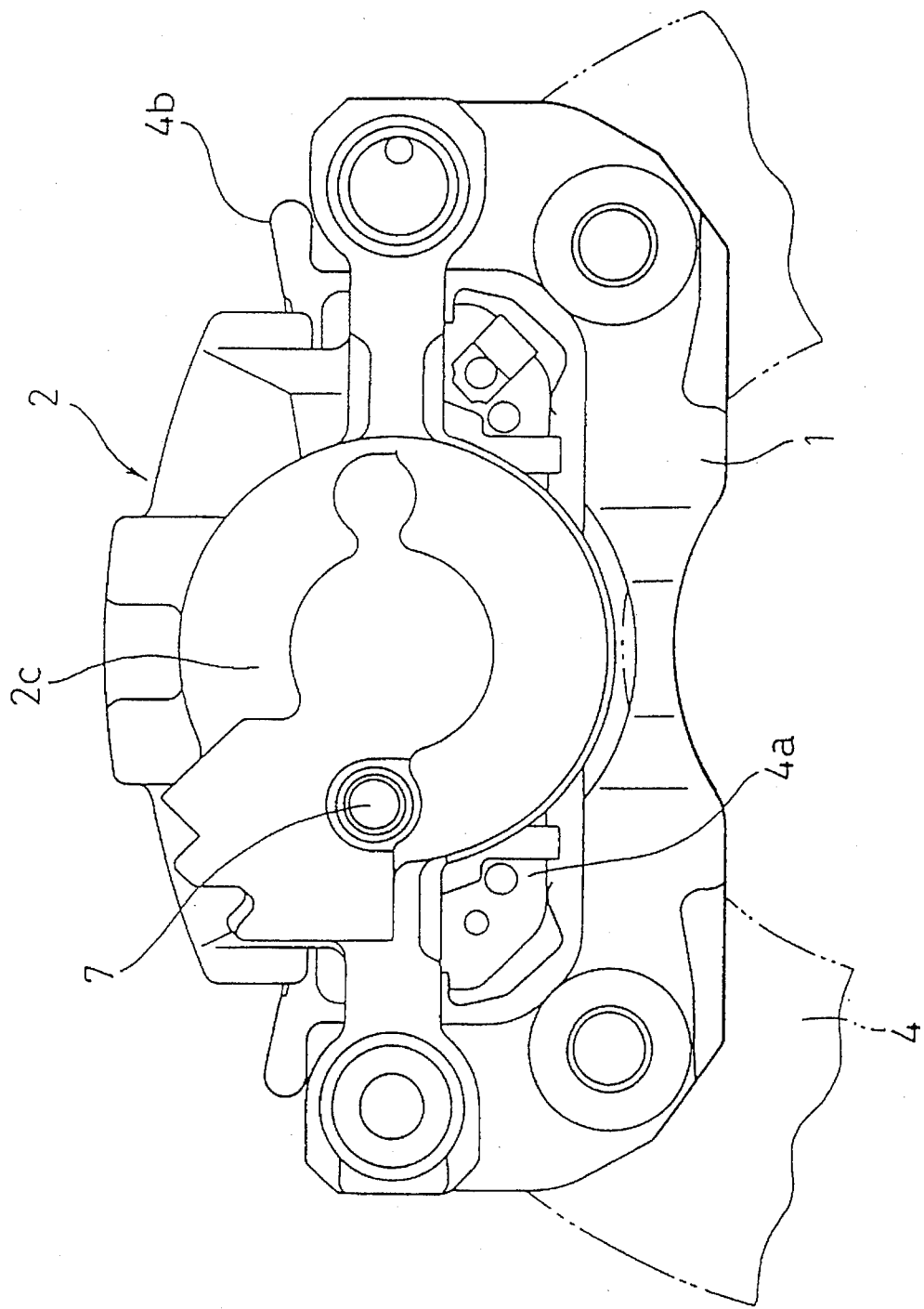
FIG. 2 is a frontal diagram of the disk brake device as embodied in Example 1.
Figure 3:
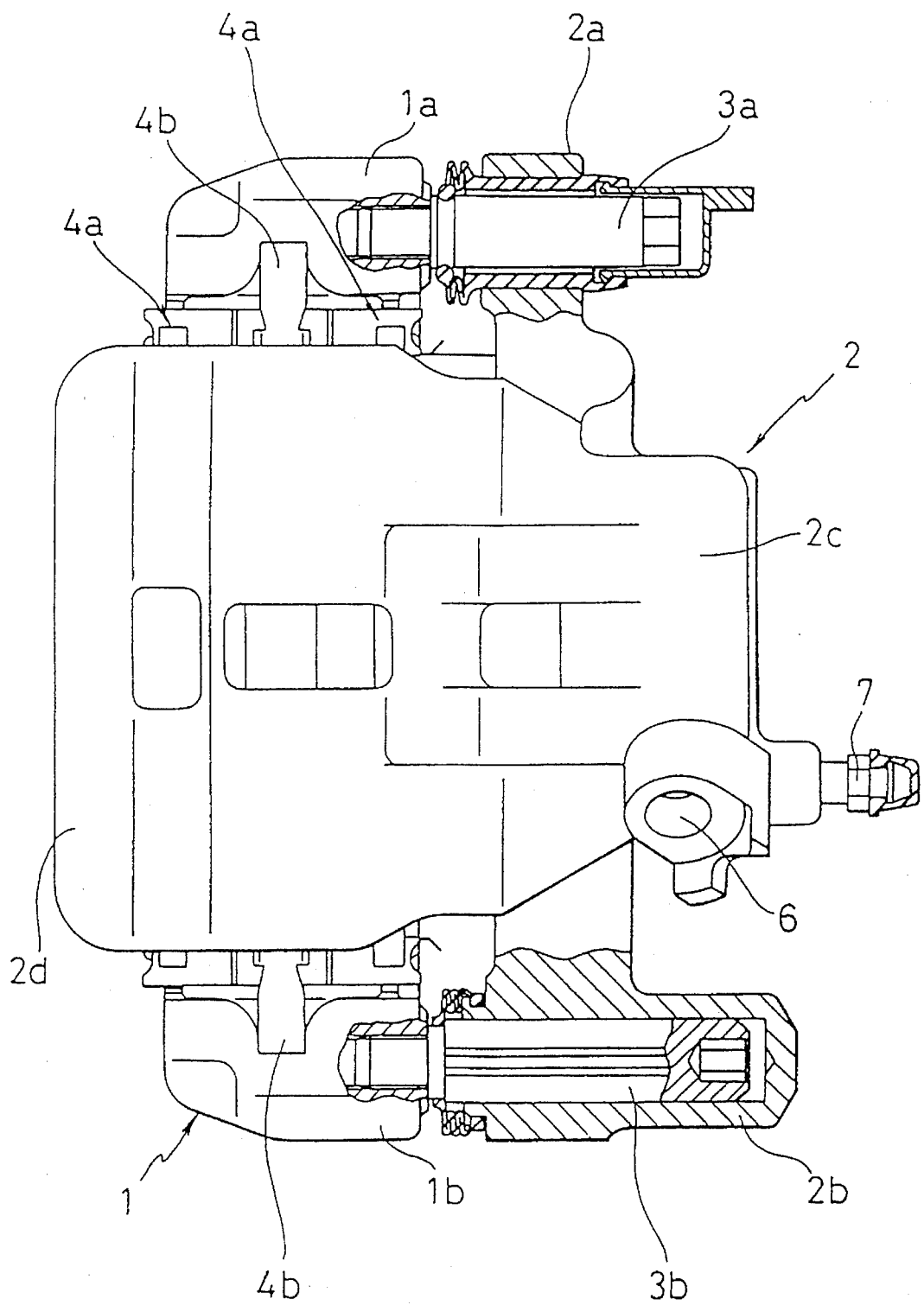
FIG. 3 is a planar diagram of the disk brake device as embodied in Example 1.
Figure 4:
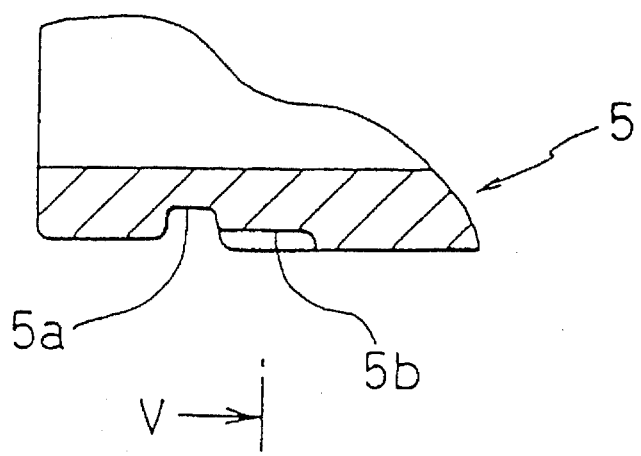
FIG. 4 is a diagram of the boot groove and air vent groove provided on the piston side of the device.
Figure 5:
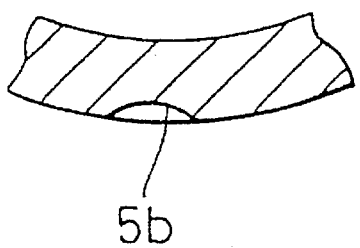
FIG. 5 is a cross section diagram of that area marked "V—V" in FIG. 4.
Figure 6:
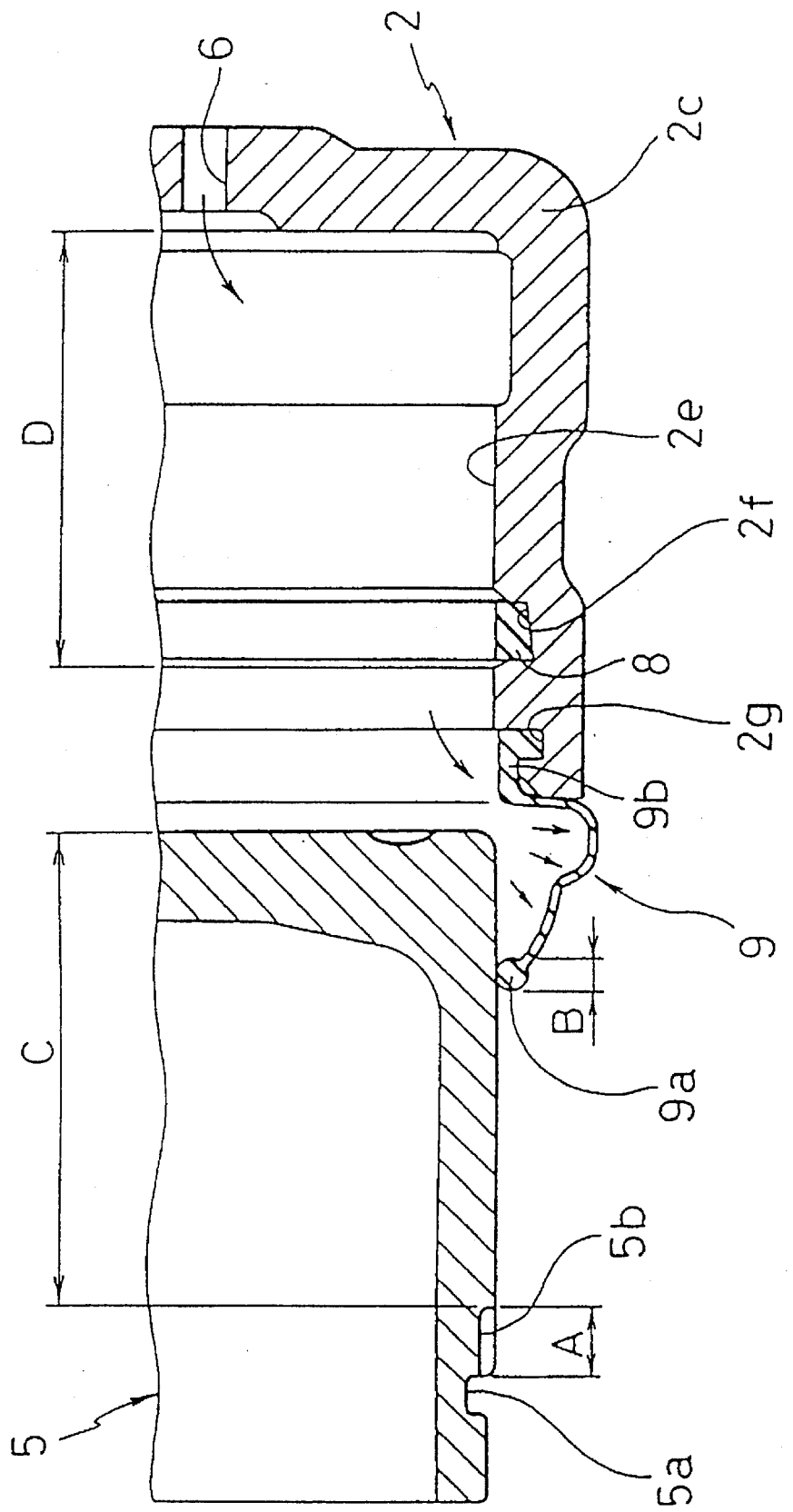
FIG. 6 is an explanatory diagram of the assembly of an internally expanding disk brake device of this invention.

An example, Example I, of this invention will be explained with reference to the diagrams.

A. Overview of disk brake device

The disk brake device is configured from a caliper 2, positioned and set to move horizontally relative to a fixed frame 1 affixed to the automobile. Arms 1a and 1b are provided on each end of the fixed frame 1 and one end of guide pins 3a, 3b are mounted on each arm respectively, while the other end is inserted into the wing 2a, 2b, respectively, of caliper 2. This configuration enables the caliper 2 to slide and retract relative to the fixed frame 1.

Extending from the cylinder 2c between the wings 2a, 2b is a hydraulic reaction chamber 2d which straddles the rotating disk 4. Inside the caliper 2, a cylinder cavity 2e is bored with the open end adjacent to the hydraulic reaction chamber 2d, and inside cylinder cavity 2e, a piston 5 is set to slide towards the hydraulic reaction chamber 2d by hydraulic pressure control.

A pair of facing friction pads 4a, 4a, one set adjacent to cylinder 2c and the other adjacent to the hydraulic reaction chamber 2d respectively, sandwiches the rotating disk 4, and are mounted to slide along the arms 1a, 1b of the fixed frame 1 by means of the pad springs 4b, 4b which serve a dual purpose as the pad liners.

B. Caliper

The caliper 2 straddles the rotating disk 4, and on one side has a cylinder 2c in which a cylinder cavity 2e is formed. Molded around the inner surface of the cylinder cavity 2e is a ring-shaped seal groove 2f, as well as a ring shaped boot groove 2g closed to the open end of the cavity. At the bottom of the cylinder 2c, a fluid inlet 6 is provided to introduce brake fluid, and an air bleeder 7 is screwed to exhaust the fluid.

C. Piston

A cup shaped piston 5 is housed to slide inside the cylinder cavity 2e. A boot groove 5a is provided around its circumference near the open end of the cylinder cavity 2e. One or more air vent grooves 5b are molded to extend from the boot groove 5a towards the bottom of piston 5.

D. Seal

A seal 8 is fitted into the ring shaped seal groove 2f molded around the inner surface of the cylinder cavity 2e, to maintain a fluid-tight seal with the piston 5. Once the piston 5 is pushed forward, release of the brake pedal causes the seal 8 to elastically deform inside the seal groove 2f, generating a refractive force on the piston 5.

E. Dust boot

The dust boot 9 has two legs. One leg 9a is squeezed with an appropriate force into the ring shaped boot groove 5a molded around the circumference of piston 5. The other leg 9b is fitted into the ring-shaped boot groove 2g provided around the inner surface of the cylinder cavity 2e, thereby sealing off the sliding surfaces of piston 5 and cylinder cavity 2e from dust and/or water. To accommodate the in-and-out motion of the piston 5, the central portion of the dust boot 9 is formed like a bellows.

The seal 8 and dust boot 9 are each made from any publicly-disclosed material such as rubber, synthetic resin, or other suitable pliable material.

F. Dimensions and relationship of each component

The axial length A of the all vent grooves 5b provided on the circumference of piston 5 must be longer than the axial length B of the leg 9a of the dust boot 9 fitted in the groove of piston 5. This ensures that the compressed air accumulated within the dust boot 9 is exhausted via the air vent groove 5b, thereby reducing the pressure inside the dust boot 9 to facilitate assembly of the piston 5. Otherwise, if length A is less than length B, the compressed air within the dust boot 9 is not adequately exhausted, and the pressure therein makes it difficult to assemble the piston 5.

Also, the length C from the bottom face of the piston 5 to the back end of the air vent groove 5b must be longer than the length D from the bottom face of the cylinder cavity 2e to the front end of the seal groove 2f, to maintain a fluid tight seal with the piston 5. Otherwise, if length C is less than length D, and if the piston 5 is pushed right to the bottom of the cylinder cavity 2e, the seal 8 of the cylinder cavity 2e will extend right up to the air vent groove 5b on the piston 5, in which case a fluid-tight seal cannot be maintained.

G. Operation of the Disk Brake Device

The seal 8 is fitted into the ring shaped seal groove 2f provided around the inner surface of the cylinder cavity 2e of caliper 2. This maintains a fluid tight seal with the piston 5. The leg 9b of the dust boot 9 is fitted into the boot groove 2g provided near the open end of the cylinder cavity 2e. Next, with the bottom of the piston 5 set close to the open end of cylinder cavity 2e, compressed air (for example, 1.5–3.0 kg/cm$^2$) is introduced into the cylinder cavity 2e from the fluid inlet 6 provided on the bottom of the cylinder 2c. This causes dust boot 9 to expand, wherein the free leg, 9a is elastically affixed to the circumference of piston 5.

Piston 5 is then inserted into the cylinder cavity 2e of caliper 2. The supply of compressed air from the fluid inlet 6 to the cylinder 2c can be stopped when the bottom of piston 5 passes through the seal 8 fitted into the groove of cylinder cavity 2e. Next, the compressed air accumulated inside the dust boot 9 is exhausted via one or more air vent grooves 5b provided around the circumference of piston 5. That is, as the piston 5 is inserted further into the cylinder cavity 2e, the air vent groove 5b provided on piston 5 penetrates beyond the leg 9a of dust boot 9, at which point the compressed air is exhausted via air vent groove 5b, and the dust boot 9, swollen with compressed air supplied from the fluid inlet 6, will return to its normal state.

With the assembly of the disk brake device as described, as the piston 5 is inserted close to the bottom of the cylinder cavity 2e, the leg 9a of dust boot 9 is transferred smoothly from the air vent groove 5b provided around the circumference of piston 5 and fitted into the boot groove 5a, thereby preventing damage to the leg 9a.

Example I explained one embodiment of this invention as applied to a fist-shaped sliding pin disk brake. However, the disk brake device is not restricted to this type of disk brake, and can be applied to an opposed piston, swinging caliper, open top, and a variety of other disk brakes.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A disk brake device comprising:
   a rotating disk capable of rotating in tandem with a wheel;

a pair of friction pads sandwiching and pressing against the rotating disk so as to be capable of creating friction;

a caliper which straddles a portion of a circumference of the rotating disk and the friction pads;

a piston housed to slide within a cylinder cavity bored in said caliper and which push the friction pads against the rotating disk;

a seal fitted into a ring-shaped groove provided around an inner face of the cylinder cavity for maintaining a fluid-tight seal with the piston; and a dust boot installed between an open end of the cylinder cavity and a ring-shaped boot groove provided on a circumference of the piston to seal off sliding surfaces;

wherein an air vent groove extends from the boot groove toward a bottom of the piston, and along an axial length of the piston, wherein a length of a leg of the dust boot that is inserted into the piston is shorter than a length of the air vent groove, and a length from the bottom face of the piston to a rear end of the air vent groove is shorter than a length from the bottom face of the cylinder cavity to a front end of the seal groove.

* * * * *